Oct. 2, 1956      H. R. WARSMITH      2,764,900
MACHINE PARTS INCLUDING RIM, TOOTH OR SEGMENT INSERTS
Filed April 18, 1955      4 Sheets-Sheet 1
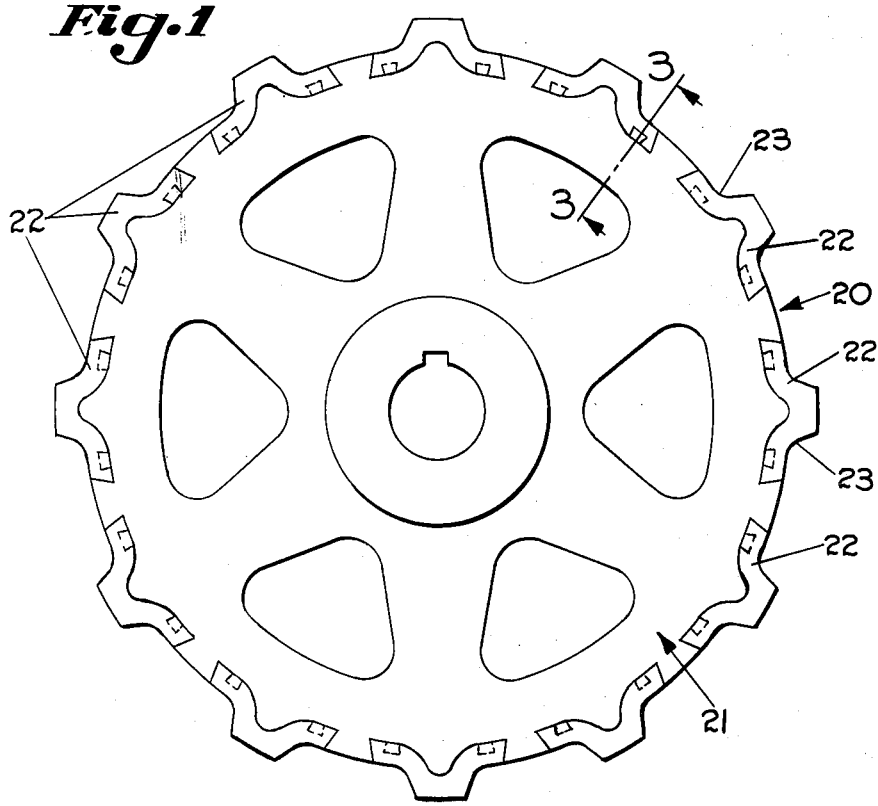
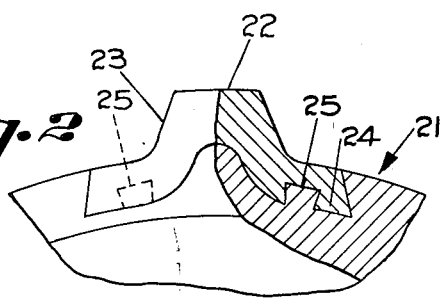
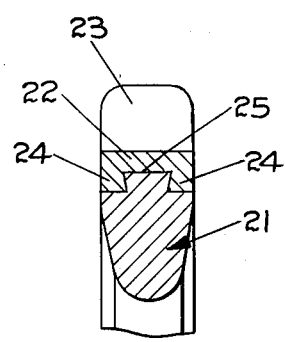
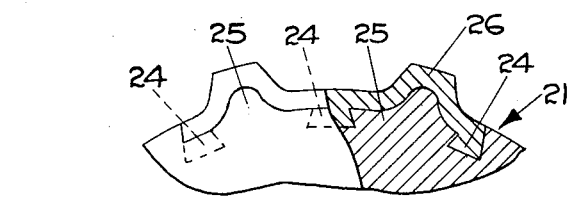
INVENTOR;
HARRY R. WARSMITH,
BY
ATTY

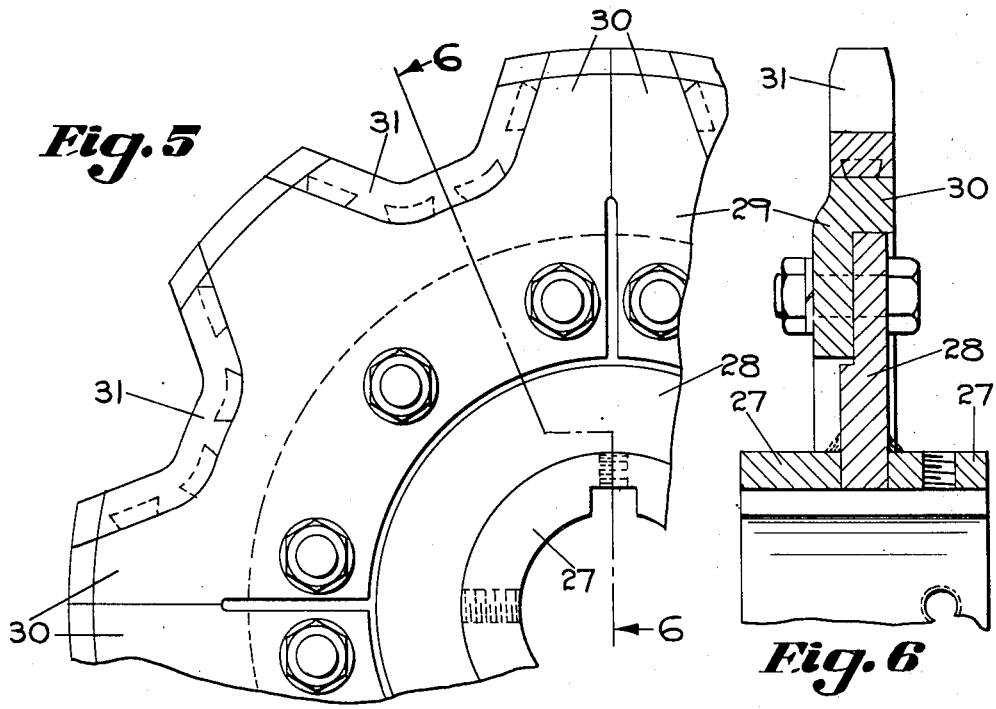
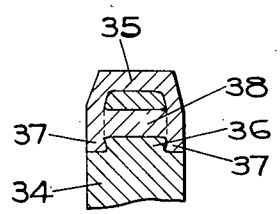
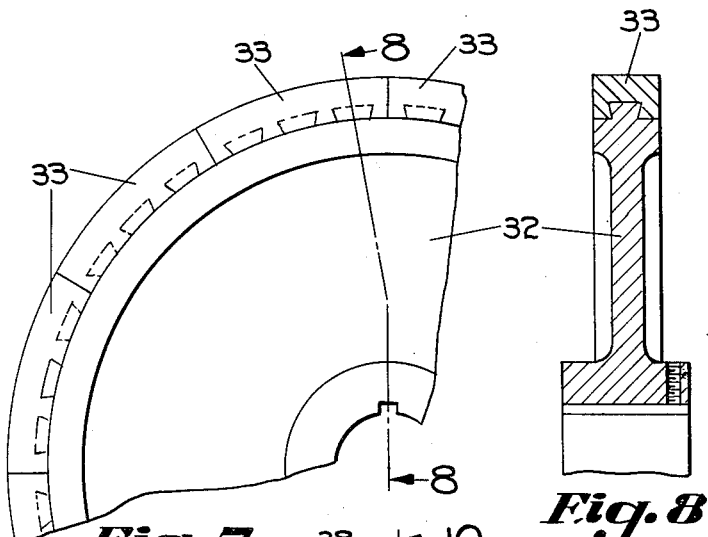
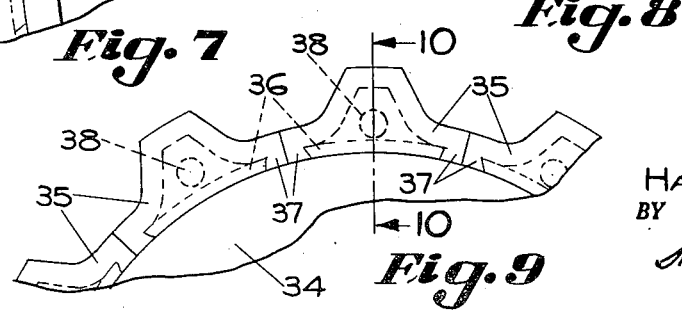

Oct. 2, 1956           H. R. WARSMITH           2,764,900
MACHINE PARTS INCLUDING RIM, TOOTH OR SEGMENT INSERTS
Filed April 18, 1955           4 Sheets-Sheet 3
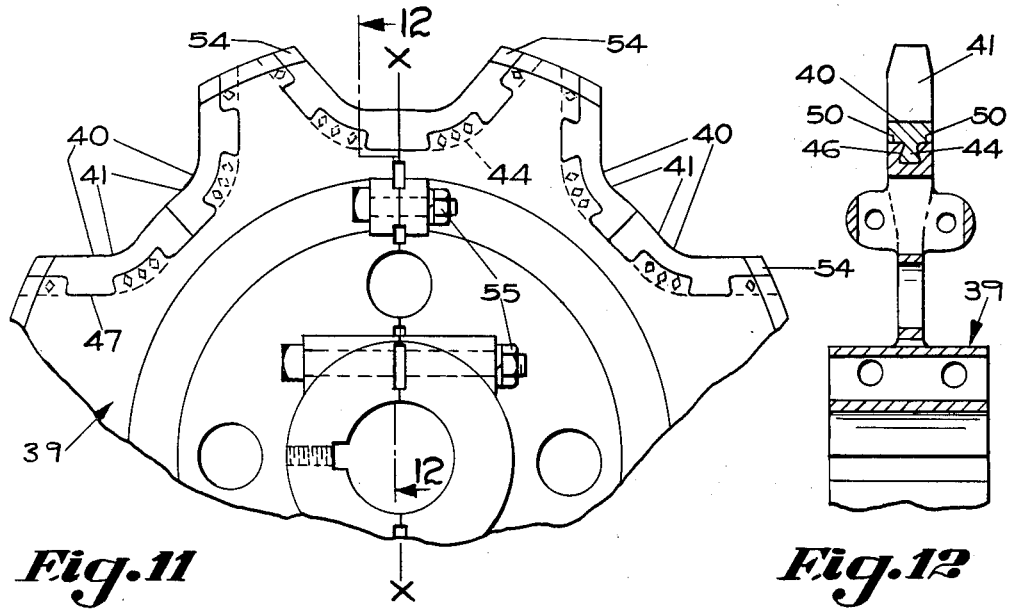
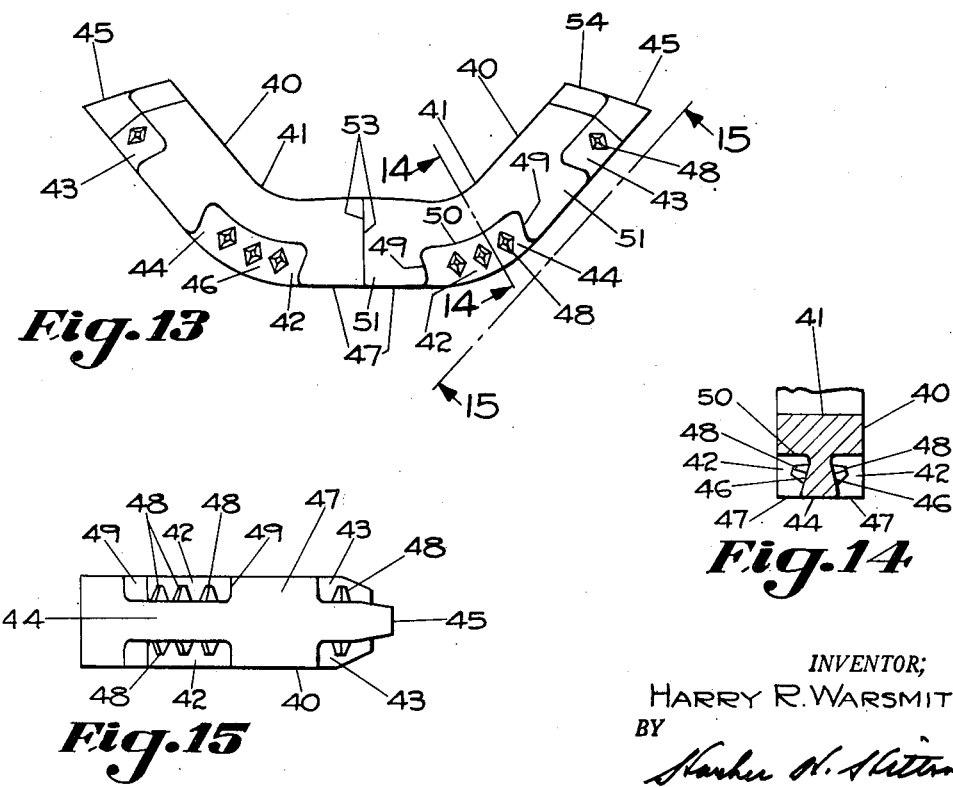
INVENTOR:
HARRY R. WARSMITH,
BY
ATTY.

Oct. 2, 1956  H. R. WARSMITH  2,764,900
MACHINE PARTS INCLUDING RIM, TOOTH OR SEGMENT INSERTS
Filed April 18, 1955  4 Sheets-Sheet 4
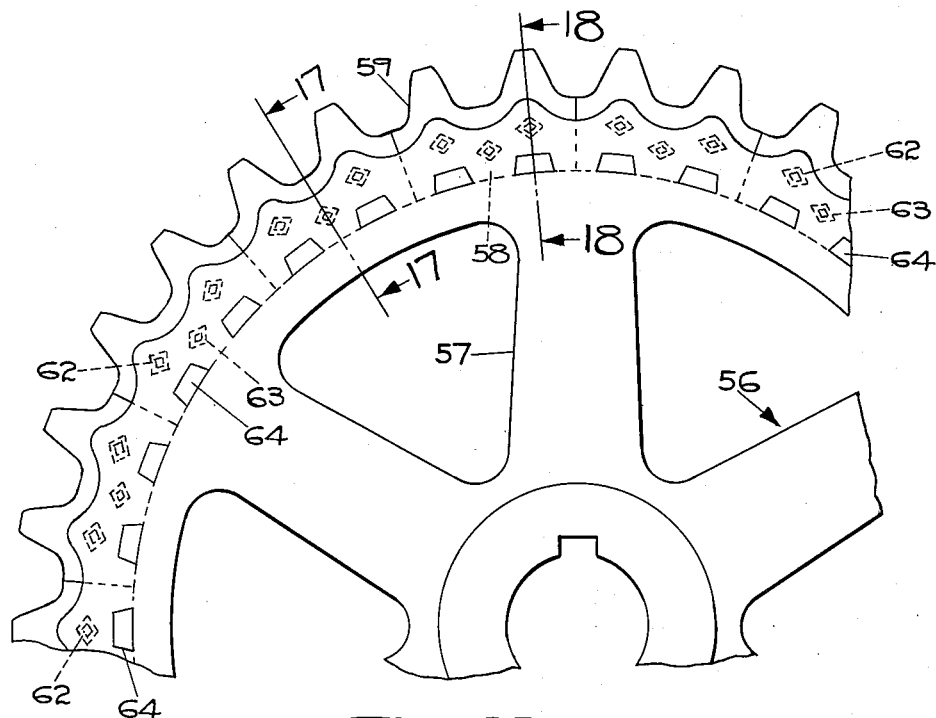
*Fig. 16*
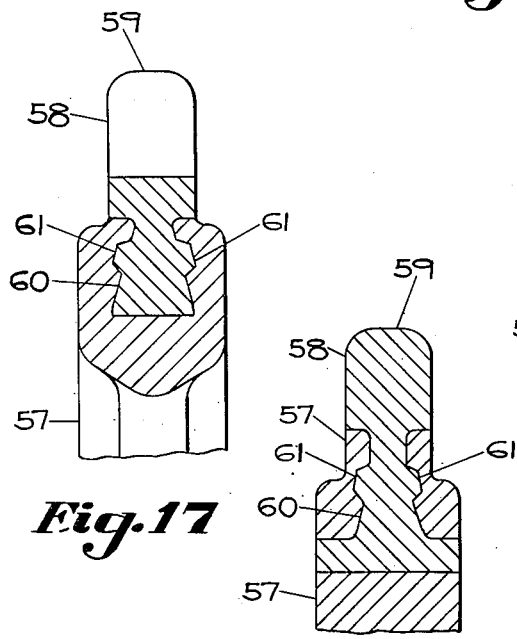
*Fig. 17*  *Fig. 18*
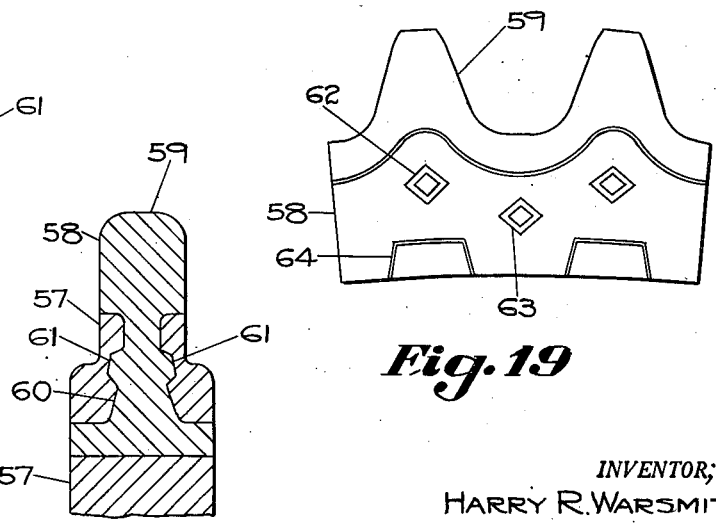
*Fig. 19*
INVENTOR;
HARRY R. WARSMITH,
BY
ATT'Y.

United States Patent Office 2,764,900
Patented Oct. 2, 1956

1

2,764,900

MACHINE PARTS, INCLUDING RIM, TOOTH OR SEGMENT INSERTS

Harry R. Warsmith, Columbus, Ohio, assignor to The Jeffrey Manufacturing Company, a corporation of Ohio Application April 18, 1955, Serial No. 501,785

20 Claims. (Cl. 74—434)

This invention relates generally to, and its main object is to provide, improved machine elements or members such as rim, tooth or segment inserts, and elements such as gears including traction wheels or sprockets, or the like, including said inserts wherein each insert is rigidly and irremovably attached to the gear or wheel body through dovetail mortise and tenon-like joints, one element of each of which is formed by the molten metal of the body flowing into or about the joint forming means of the insert and upon cooling, shrinking and clamping the insert irremovably to the body, the inserts preferably having a constituency to increase appreciably the life of the gear.

Another object of the invention is to provide an improved machine part such as a rim, tooth or segment insert including dovetail mortise and/or tenon-like means through which the insert may be united with the body element of a gear, for example.

Another object of the invention is to provide a wheel element having body means made of cast metal and a segment made of a different cast metal, preferably a harder metal, which is joined integrally with the body means and forms a permanently united unit, the segment having a shank which includes lug means so that when the body member is cast the metal flows around said shank and lug means and forms a permanent joint therewith.

Other objects of the invention will appear hereinafter, the novel features and combinations being set forth in the appended claims.

In the accompanying drawings:

Fig. 1 is an elevational view of a sprocket wheel or gear incorporating the features of my invention;

Fig. 2 is an enlarged combination elevational and sectional view showing one of the tooth inserts attached to the body of the gear of Fig. 1;

Fig. 3 is a sectional view on the line 3—3 of Fig. 1, looking in the direction of the arrows;

Fig. 4 is a combined elevational and sectional view of a portion of a sprocket wheel or gear showing a modified form of insert forming a pair of adjacent sprocket wheel teeth;

Fig. 5 is an elevational view of a segment of a modified form of sprocket wheel type of gear incorporating my invention;

Fig. 6 is a sectional view taken on the line 6—6 of Fig. 5, looking in the direction of the arrows;

Fig. 7 is an elevational view of a segment of a gear incorporating my invention which constitutes a traction wheel having a generally smooth rim;

Fig. 8 is a sectional view on the line 8—8 of Fig. 7, looking in the direction of the arrows;

Fig. 9 is an elevational view of still another form of sprocket wheel incorporating my invention;

Fig. 10 is a sectional view taken on the line 10—10 of Fig. 9, looking in the direction of the arrows;

Fig. 11 is an elevational view of a portion of still another sprocket wheel or gear including another modified form of insert incorporating features of the invention;

2

Fig. 12 is a view in section, the section being taken on line 12—12 of Fig. 11;

Fig. 13 is a side view in elevation of two of the inserts seen in Fig. 11;

Fig. 14 is a view in section, the section being taken on line 14—14 of Fig. 13;

Fig. 15 is a view in elevation looking at the base or bottom of one of the inserts, the view being taken on the plane 15—15 of Fig. 13;

Fig. 16 is an elevational view of a portion of a sprocket wheel having a modified form of insert incorporating features of the invention;

Fig. 17 is a sectional view on the line 17—17 of Fig. 16, looking in the direction of the arrows;

Fig. 18 is a sectional view on the line 18—18 of Fig. 16, looking in the direction of the arrows; and Fig. 19 is an enlarged elevational view of one of the segments attached to the wheel shown in Fig. 16.

This appplication is a continuation-in-part of my application Serial No. 440,032, filed June 29, 1954, for Machine Parts Including Rim, Tooth or Segment Inserts, now abandoned, which application is a continuation-in-part of my application Serial No. 171,022, filed June 29, 1950, now abandoned, and which latter application is a continuation-in-part of my application Serial No. 124,879, filed November 1, 1949, now Patent No. 2,588,900, dated March 11, 1952.

In Figs. 1, 2 and 3 of the drawings there is illustrated a machine element or member in the form of a sprocket wheel or gear 20 that is formed entirely of cast elements and which includes a cast body 21 that carries a plurality of cast teeth in the form of inserts, sections or segments 22. Each insert 22 is rigidly mechanically irremovably attached to the body 21 of the gear 20 by interlocking mortise and tenon-like joint means, as clearly illustrated in Figs. 2 and 3 of the drawings. This is preferably effectuated by positioning the teeth inserts 22 in a foundry mold, not shown, and then casting or molding the body 20 so as to make the rigid interconnection illustrated in the drawings.

As shown in Figs. 1 through 3 of the drawings, each of the inserts 22 is formed to include a surface 23 which, when the segment is made a part of the sprocket wheel or gear 20, provides a portion of the peripheral wearing surface thereof which cooperates with a chain or the like. Each insert 22 is also formed to include in its base portion surfaces that cooperate to form elements of inseparable dovetail mortise and tenon-like joints. Certain of these surfaces cooperate to form dovetail ribs, tongues or tenons 24 and certain of them cooperate to form dovetail mortises or cavities 25. It will be seen that because opposite end surfaces of each of the inserts 22 slope generally toward the theoretical apex of the tooth portion of each insert 22, that the entire base of the insert also forms a tongue or tenon and that the metal of the body 21 cooperates with it to form a mortise.

The mortise and tenon elements 25 and 24 of the insert 22 shown in Figs. 1 through 3 of the drawings are of trapezoidal shape in cross-section, though they may, as indicated in Figs. 4 through 15, be of any other shape that will provide surfaces adapted to be seized by a mortise, tenon, or its equivalent, formed when the molten metal of the body 21 flows into and/or around the base or bottom of the insert 22 and shrinks upon cooling.

The tooth inserts, sections or segments 22 are preferably made of a hard iron alloy so as to increase appreciably the life of the teeth and thus of the complete sprocket wheel or machine element, as compared with that of an ordinary cast iron sprocket wheel. For example, the said tooth inserts 22 are preferably made of a hard cast iron alloy including nickel and chromium providing an abrasion resisting material and one which has a hardness of from 50 to 62 Rockwell. Such a hard iron alloy is commercially available and, as manufactured by one leading producer, is known in the trade under the name "Ni-Hard." The analysis of this type of iron is well understood in the metallurgical art.

One typical analysis includes, in addition to the iron, nickel from 4.25 to 4.75%, chromium from 1.80 to 2.0%, carbon, preferably not more than 2.70 to 3.10%, though sometimes this is allowed to go as high as 3.60%.

Normal amounts of manganese, phosphorous, sulphur and silicon are usually involved, such as manganese .45 to .70%, phosphorous preferably not over .40%, and sulphur preferably not over .15%.

In Fig. 4 of the drawings a modified form of insert is seen at 26 which differs from the insert 22 significantly only in that it embraces a pair of adjacent teeth of a sprocket wheel and thus provides a continuous peripheral wearing surface of the hard iron alloy between said adjacent teeth.

Fig. 5 of the drawings illustrates a somewhat different form of sprocket wheel or gear in which there is a built-up sprocket including a hub 27 to which a disc type wheel 28 is rigidly attached, as by welding. A sectional rim 29 is provided for the wheel 28 and is removably attached thereto as by a plurality of bolts. The rim 29 is of cast iron and is formed to provide teeth 30 in which knuckle, barrel or roller gaps or pockets are formed by hard iron alloy inserts, sections or segments 31 which are formed of the same material as the teeth 22 and are attached to the teeth 30 in fundamentally the same way that teeth 22 and 26 are attached to the body 21. In the form of sprocket shown in Fig. 5 it is, of course, the hard iron alloy inserts, sections or segments 31 which provide the wearing or bearing areas which cooperate with an associated chain.

In Figs. 7 and 8 of the drawings another form of gear is illustrated, including a cast iron hub and body 32 having a smooth generally cylindrical rim formed of a plurality of adjacent inserts, sections or segments 33 which have the constituency above described for the inserts 22, 26 and 31 and are attached to the body 32 as are said inserts 22, 26 and 31. This provides a friction type of traction wheel gear in which the entire periphery of the rim provided by the inserts or sections 33 constitutes the wearing and bearing surface which cooperate with a chain or the like.

In Figs. 9 and 10 of the drawings there is illustrated still another wheel in the form of a toothed sprocket gear incorporating my invention, in which there is a wheel body 34 to which hard iron alloy teeth 35 are integrally attached by molding, as are the inserts 22, 26 and 31, the teeth 35 each being formed to include a mortise or cavity 36 having an open side in its bottom or base portion, surrounded by tenons 37, and a transversely extending cylindrical portion 38 adapted to be completely surrounded by metal during the pouring of the body 34 to provide the above described mortise or cavity and tenon-like joint means by which the metal of the body seizes and interlocks each tooth, segment or insert 35 and the body 34. In the sprocket of Figs. 9 and 10 the complete periphery or wearing surface is of the hard iron alloy and definite teeth are provided on the sprocket which cooperate with a chain or the like.

In the modification shown in Fig. 11 of the drawings, the sprocket wheel or gear includes a two piece cast iron body 39 made from a single casting on which the wearing surfaces or teeth have been formed by inserts, sections or segments 40 that include the present invention. The teeth inserts 40 are rigidly and irremovably attached to the later cast body 39 of the gear by interlocking mortise and tenon-like joints, as clearly indicated in Figs. 11 and 12 of the drawings.

Each of the sections or inserts 40 is formed to include a wear surface 41 which, when the insert is made a part of the sprocket wheel or gear, provides a portion of the peripheral wearing surface thereof which cooperates with a chain or the like, and each insert 40 is also formed to include surfaces or walls in its base that cooperate to form elements of dovetail mortise and tenon-like joints through which the segment 40 is seated and clamped upon the body 39.

In the particular inserts 40 shown in Figs. 11 through 15 of the drawings these surfaces also cooperate to form two similar mortises or pockets 42 and two similar mortises or pockets 43, each pair of which is separated by a tapered or dovetail rib, tenon or tongue 44 and 45 respectively.

The opposite side walls of the rib, tenon or tongue 44 are formed by surfaces or walls 46 (see Fig. 14) which extend from the outermost surface 47 of the base of the insert inwardly and slope toward each other to form the dovetail tenon 44 and each defines a side wall of one of the dovetail mortises 42. It is to be noted that the inwardly tapered dovetail ribs, tenons or tongues 44 and 45 include one or more integral laterally extending pyramids, projections or lugs 48 that extend in opposite directions from the surfaces or walls 46 of the tenon and into the spaced mortises 42. The important function of these pyramids, projections or lugs 48 is set forth hereinafter.

The dovetail mortises 42 and 43 are actually inwardly extending, outwardly tapered cavities formed in the base of the insert 40 when it is cast and each of the mortises or cavities 42 is formed by one of the surfaces or walls 46 which is faired at its ends through smooth curves into a pair of end surfaces or walls 49 which extend laterally therefrom to form the opposite inwardly tapering end surfaces or walls of the mortise. All of the walls 44 and 49 are faired into a surface or wall 50 which forms the bottom of the mortise 42 and they are faired into the outermost surface or wall 47 of the base of the insert 40.

From the foregoing it will be seen that the two mortises 42 are separated or spaced in the base of the insert 40 by a rib, tenon or tongue 44 and that each mortise 42 has two open sides, namely, an open side at one side of the insert 40 and an open side extending through the outermost base surface or wall 47 thereof.

The dovetail mortises or pockets 43 are similar in construction to the dovetail mortises 42 except that they are located at one end of the segment and, therefore, have three open sides, namely, an open side at each the side and base of the insert 40 and an open side at an end of the insert 40.

From the foregoing description it will be seen that the mortises 42 and 43 at each side of the insert 40 are also separated or spaced by a dovetail rib, tenon or tongue 51 which extends transversely of the insert 40 from one of its sides and that the mortises 42 are each surrounded or formed by three tenons 44 and 51 while the mortises 43 are each flanked on two adjacent sides by a tenon 45 and 51.

One end 53 of each insert 40 is at right angles to both the wear surface 41 and the bottom surface 47 of the segment in order that the teeth or inserts 40 may be placed in end to end abutting relation as shown in Figs. 11 and 13 of the drawings when they are incorporated into the body 39 and the other end 54 of each insert is sloped in order to conform to the peripheral shape of the sprocket wheel tooth of which it forms a part.

The inserts 40 are preferably made of the hard iron alloy, above described, so as to increase appreciably the life of the teeth and thus the complete machine element, as compared with that of an ordinary cast iron machine element.

The complete sprocket gear or wheel shown in Fig. 11 of the drawings, except for the bolts 55 which secure its two halves together, is made entirely of cast materials. All of the sprocket wheels or gears shown in the drawings are, of course, formed in a similar manner, and to form the complete sprocket gear or wheel shown in Fig. 11 of the drawings, for example, the requisite number of precast or poured tooth or segment inserts 40 are arranged, as indicated in Fig. 11 of the drawings, in a mold, not shown, and the molten material (usually iron) of the body 39 is then poured into the mold and into contact with the bases of the inserts 40. This later cast body material will, of course, completely fill the mold to form the body 39 as one unit, or as a single casting, and some of it will flow into the dovetail mortises, pockets or cavities 42 and 43 and around the pyramids, projections or lugs 46 and this body material will, of course, be shaped by the mortises and tenons of inserts 40 to form the mortise and tenon elements which are integral parts of the body 39.

It will be seen that because of the nature of the metal of which the body 39 is made, the body 39 and the joint elements thereof will shrink during cooling of the body and that this shrinkage will cause the dovetail elements of the body 39 to seize the dovetail elements of the inserts 40 and draw or clamp the inserts, in a purely mechanical fashion, into engagement with the rim of the body 39, which, of course, will result in a firm seating or clamping of the inserts 40 upon the body 39. In this connection the pyramids, projections or lugs 48 play an important role. These pyramids, projections or lugs extend generally at right angles from the surfaces 46 of the tenons 44 and 45 and into the mortises 42 and 43. They increase the amount of surface in the mortises and tenon-like joints through which the shrinking material of the body may seize the segments thereby effecting stronger and tighter connections between the inserts 40 and body 39. They also add much strength to the mortise and tenon-like joint means to resist radial separation or tearing of the inserts 40 from the body 39.

When the body 39 has cooled sufficiently the entire sprocket gear or wheel will be removed from the mold. It may then be subjected to machining operations, such, for example, as boring, and, in the embodiment seen in Figs. 11 through 15, it is finally cracked into two pieces along line X—X of Fig. 11 to produce the finished two-piece sprocket gear or wheel.

In Fig. 16, the wheel element or gear 56 comprises a body member 57 made of cast metal, which may be cast iron, for example, and a segment or insert 58, shown most clearly in Fig. 19, which is also made of cast metal. Segment 58 may be formed of a different cast metal from that used in the body member 57, and in the preferred form is cast of a harder metal such as heretofore described in connection with Fig. 1. The body member 57 and segment 58 are joined integrally when the body member is cast and form a permanently united unit. Segment 58 is formed with a peripheral wearing surface 59 which cooperates with a chain or the like. Each segment 58 is also cast with a shank portion or dovetail tenon-like element 60, Figs. 17 and 18. Lug means 61 comprises one or more projections which extend outwardly from the sides of the segments. As shown in Fig. 19, the lugs or projections 61 may be spaced at regular intervals and in rows along the sides of the segment 58. The lug means shown includes a row of said lugs indicated at 62, a second row of lugs at 63, and a third row of lugs at 64 in Fig. 16. The lug means may comprise a single row of projections aligned in a regular or a staggered relation or pattern relative to each other along the segment. As seen most clearly in Figs. 17, 18 and 19, lugs 61, in rows 62 and 63 for example, are in the form of truncated diamond-shaped projections the ends of which are covered by mortise-like portions of the body member 57. The ends of the projections in row 64, for example, extend so that the end portions thereof are exposed at the sides of the body member.

It is to be understod, however, that more or less than three rows of lugs may be used if desired, depending upon the size of the segment, and that the present invention is not limited to the use of any particular number of rows of lugs spaced in the relationship shown. It will also be obvious to those skilled in the art that a different pattern of the spacing of the lugs illustrated in Fig. 19 can be used and that the number, size, shape and height of the lugs may vary in proportion to those shown and described herein in relation to the size and weight, for example, of the wear element or gear.

From the above description it will be apparent that the body member and segment can be permanently united into a unit when assembled by casting the body member last so that the metal body member flows around said shank portion and said lug means whereby the metal, upon cooling, shrinks and seizes the shank portion and lug means and forms a permanent joint therewith.

It has been found in practice that the life of a gear, whether a sprocket wheel or a traction wheel, or other form, is very greatly increased by the use of these hard iron inserts, sections or segments which provide the bearing or wearing areas of the gear. It has further been found that the hard iron wears to a smooth velvety finish and very appreciably increases the life of the chain which works with the sprocket, traction wheel or other gear. Thus not only is the life of the gear extended, as compared with prior known gears, but the life of the associated working chain is also greatly increased.

It has been found that in a wheel or sprocket including segments and a cast body in which each segment is united to the cast body by a union wherein each segment includes or forms one element of a dovetail mortise and tenon-like joint and wherein one of the mortise or tenon elements is formed by the molten metal of the body during the casting of the body, that the segment is drawn or clamped securedly to the body of the sprocket, gear or wheel by the shrinkage of the body metal, and that a better and stronger purely mechanical union is made between the segment and the cast body and that the segments may be employed to withstand heavy loads without becoming detrimentally loose on the body or tearing or breaking away from it.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what is desired to secure by Letters Patent of the United States is:

1. A wheel element including a body member made of a cast metal including iron, and a segment made of a different cast metal fixed permanently on said body member, said segment forming at least a part of a peripheral wear surface of said wheel element; being made of a hard iron alloy including nickel and chromium; having a hardness of between 50 and 62 Rockwell; and including means adapted to form one element of an inseparable dovetail mortise and tenon-like joint, said body member forming the other element of said inseparable dovetail mortise and tenon-like joint, said body and segment members being assembled permanently by casting the body metal last whereby said joint element thereof upon cooling shrinks and mechanically seizes said joint element of said segment thereby clamping said segment tightly on and inseparably from said body member.

2. A wheel element including a body member made of cast metal including iron, and a segment made of a different cast metal fixed permanently on said body member, said segment forming at least a part of a peripheral wear surface of said wheel element; being made of a hard iron alloy including nickel and chromium; and including means adapted to form one element of an inseparable dovetail mortise and tenon-like joint, said body member forming the other element of said inseparable dovetail mortise and tenon-like joint, said body and segment members being assembled permanently by casting the body metal last whereby said joint element thereof upon cooling shrinks and mechanically seizes said joint element of said segment thereby clamping said segment tightly on and inseparably from said body member.

3. A wheel element including a body member made of a cast metal including iron, and a segment made of a different cast metal fixed permanently on said body member, said segment forming at least a part of a peripheral wear surface of said wheel element; and including means adapted to form one element of an inseparable dovetail mortise and tenon-like joint, said body member forming the other element of said inseparable dovetail mortise and tenon-like joint, said body and segment members being assembled permanently by casting the body metal last whereby said joint element thereof upon cooling shrinks and mechanically seizes said joint element of said segment thereby clamping said segment tightly on and inseparably from said body member.

4. A wheel element including a body member made of a cast metal, and a segment fixed permanently on said body member, said segment forming at least a part of a peripheral wear surface of said wheel element; and including means adapted to form one element of an inseparable dovetail mortise and tenon-like joint, said body member forming the other element of said inseparable dovetail mortise and tenon-like joint, said body and segment members being assembled permanently by casting the body metal into contact with said segment whereby the joint element of said body member upon cooling shrinks and mechanically seizes said joint element of said segment thereby clamping said segment tightly on and inseparably from said body member.

5. A wheel including a body member made of a cast metal including iron, a plurality of segments made of a different cast metal fixed permanently on said body member, each of said segments forming at least a part of a peripheral wear surface of said wheel; being made of a hard iron alloy including nickel and chromium; having a hardness of between 50 and 62 Rockwell; and including means adapted to form one element of an inseparable dovetail mortise and tenon-like joint, said body member forming the other element of said inseparable dovetail mortise and tenon-like joint, said body and segment members being assembled permanently by casting the body last whereby said joint element thereof upon cooling shrinks and mechanically seizes said joint elements of said segment thereby clamping said segment tightly on and inseparably from said body member.

6. A wheel including a body member made of a cast metal including iron, a plurality of segments made of a different cast metal fixed permanently on said body member, each of said segments forming at least a part of a peripheral wear surface of said wheel; being made of a hard iron alloy including nickel and chromium; and including means adapted to form one element of an inseparable dovetail mortise and tenon-like joint, said body member forming the other element of said inseparable dovetail mortise and tenon-like joint, said body and segment members being assembled permanently by casting the body metal last whereby said joint element thereof upon cooling shrinks and mechanically seizes said joint element of said segment thereby clamping said segment tightly on and inseparably from said body member.

7. A wheel including a body member made of a cast metal including iron, a plurality of segments made of a different cast metal fixed permanently on said body member, each of said segments forming at least a part of a peripheral wear surface of said wheel; and including means adapted to form one element of an inseparable dovetail mortise and tenon-like joint, said body member forming the other element of said inseparable dovetail mortise and tenon-like joint, said body and segment members being assembled permanently by casting the body metal last whereby said joint element thereof upon cooling shrinks and mechanically seizes said joint element of said segment thereby clamping said segment tightly on and inseparably from said body member.

8. A wheel including a body member of a cast metal, a plurality of segments fixed permanently on said body member, each of said segments forming at least a part of a peripheral wear surface of said wheel; being made of a hard iron alloy including nickel and chromium; and including means adapted to form one element of an inseparable dovetail mortise and tenon-like joint, said body member forming the other element of said inseparable dovetail mortise and tenon-like joint, said body and segment members being assembled permanently by casting the body metal into contact with said segments whereby the joint elements of said body member upon cooling shrink and mechanically seize said joint elements of said segments thereby clamping said segments tightly on and inseparably from said body member.

9. A sprocket wheel including a body made of a cast metal including iron, a plurality of tooth segments made of a different cast metal fixed permanently on said body, said teeth being made of a hard iron alloy including nickel and chromium; having a hardness of between 50 and 62 Rockwell and forming at least a part of a peripheral wear surface of said wheel; and being cast to form one element of an inseparable dovetail mortise and tenon-like joint, said body member forming the other element of said inseparable dovetail mortise and tenon-like joint, said body and tooth segments being assembled permanently by casting the body metal last whereby said joint elements thereof upon cooling shrink and mechanically seize said joint elements of said segments thereby clamping said segments tightly on and inseparably from said body member.

10. A sprocket wheel including a body made of a cast metal, a plurality of tooth segments made of a different cast metal fixed permanently on said body, said teeth each being made of a hard iron alloy including nickel and chromium and forming a peripheral wear surface of said wheel; and being cast to form one element of an inseparable dovetail mortise and tenon-like joint, said body member forming the other element of said inseparable dovetail mortise and tenon-like joint, said body and tooth segments being assembled permanently by casting the body metal last whereby said joint elements thereof upon cooling shrink and mechanically seize said joint elements of said segments thereby clamping said segments tightly on and inseparably from said body member.

11. A sprocket wheel including a body made of a cast metal, a plurality of tooth segments fixed permanently on said body, said teeth each being made of a hard iron alloy and forming at least a part of a peripheral wear surface of said wheel; and being cast to form one element of an inseparable dovetail mortise and tenon-like joint, said body member forming the other element of said inseparable dovetail mortise and tenon-like joint, said body and tooth segments being assembled permanently by casting the body metal last whereby said joint elements thereof upon cooling shrink and mechanically seize said joint elements of said segments thereby clamping said segments tightly on and inseparably from said body member.

12. A sprocket wheel including a body made of a cast metal, a plurality of teeth fixed permanently on said body and forming at least a part of a peripheral wear surface of said wheel, said teeth each including means forming one element of an inseparable dovetail mortise and tenon-like joint, said body member forming the other element of said inseparable dovetail mortise and tenon-like joint, said body and tooth segments being assembled permanently by casting the body metal last whereby said joint elements thereof upon cooling shrink and mechanically seize said joint elements of said teeth thereby clamping said teeth tightly on and inseparably from said body member.

13. A sprocket tooth forming an integral part of a wheel made entirely of cast metals, said tooth being cast of a hard iron alloy including nickel and chromium; having a hardness of between 50 and 62 Rockwell and forming at least a part of a peripheral wear surface of said wheel; and including means forming one element of an inseparable dovetail mortise and tenon-like joint into which the metal of the body element of said wheel is cast to form the other element of said mortise and tenon-like joint.

14. A wheel element comprising a body member made of cast metal and a segment made of a harder cast metal joined integrally with said body member to form a permanently united unit, said segment forming a peripheral wear surface of said wheel element and including a dovetail tenon-like element having lug means projecting outwardly from the sides thereof, and said body member and segment being permanently united into a unit when assembled by casting the body member last so that the metal of the body member flows around and covers said tenon-like element and said lug means whereby said metal upon cooling shrinks and seizes said tenon-like element and lug means to form a permanent joint therewith.

15. A wheel element comprising a body member made of cast metal and a segment made of a different cast metal joined integrally with said body member to form a permanently united unit, said segment forming a peripheral wear surface of said wheel element and including a shank portion having lug means projecting outwardly from the sides thereof, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

16. A wheel element comprising a body member made of cast metal and a segment made of a different cast metal joined integrally with said body member to form a permanently united unit, said segment forming a peripheral wear surface of said wheel element and including a shank portion having lug means in the form of projections extending outwardly on the side thereof and spaced at regular intervals along said segment, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

17. A wheel element comprising a body member made of cast metal and a segment made of a different cast metal joined integrally with said body member to form a permanently united unit, said segment forming a peripheral wear surface of said wheel element and including a shank portion having lug means in the form of projections extending outwardly on the side of said shank portion, one of said projections extending so that an end portion thereof is exposed at the side of said body member, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

18. A wheel element comprising a body member made of cast metal and a segment made of a different cast metal joined integrally with said body member to form a permanently united unit, said segment forming a peripheral wear surface of said wheel element and including a shank portion having lug means projecting outwardly from the side of said shank portion in rows extending along said segment, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

19. A wheel element comprising a body member made of cast metal and a segment made of a different cast metal joined integrally with said body member to form a permanently united unit, said segment forming a peripheral wear surface of said wheel element and including a shank portion having lug means comprising rows of projections extending outwardly from the side of said shank portion, one of said rows having the projections spaced at staggered intervals therein along said segment and another row having the projections spaced at regular intervals therein along said segment, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

20. A wheel element comprising a body member made of cast metal and a segment made of a different cast metal joined integrally with said body member to form a permanently united unit, said segment forming a peripheral wear surface of said wheel element and including a shank portion having lug means comprising rows of projections extending outwardly from the side of said shank portion in spaced relation relative to each other along said segment, and said body member and segment being permanently united into a unit when assembled by casting the body member last so that the metal of the body member flows around said shank portion and said lug means whereby said metal upon cooling shrinks and seizes said shank portion and lug means to form a permanent joint therewith.

References Cited in the file of this patent

UNITED STATES PATENTS

| Number | Name | Date |
|---|---|---|
| 191,155 | Jones | May 22, 1877 |
| 688,570 | Anthony et al. | Dec. 10, 1901 |
| 901,916 | Farquhar | Oct. 27, 1908 |
| 1,005,736 | Wilkinson | Oct. 10, 1911 |
| 1,128,789 | Juengst | Feb. 16, 1915 |
| 1,212,608 | Calkins | Jan. 16, 1917 |
| 1,323,962 | Byers | Dec. 2, 1919 |
| 1,358,189 | Fitzpatrick | Nov. 9, 1920 |
| 1,393,886 | Doty | Oct. 18, 1921 |
| 1,643,472 | Rorabeck | Sept. 29, 1927 |
| 1,648,550 | Kantor | Nov. 8, 1927 |
| 2,051,915 | Sykes | Aug. 25, 1936 |
| 2,331,909 | Hensel et al. | Oct. 19, 1943 |

FOREIGN PATENTS

| Number | Country | Date |
|---|---|---|
| 371,262 | Great Britain | Apr. 21, 1932 |